(12) United States Patent
Harres et al.

(10) Patent No.: US 8,406,472 B2
(45) Date of Patent: Mar. 26, 2013

(54) METHOD AND SYSTEM FOR PROCESSING IMAGE DATA

(75) Inventors: Dennis Harres, Stuttgart (DE); Christian Unruh, Stuttgart (DE)

(73) Assignee: Sony Corporation, Tokyo (JP)

( * ) Notice: Subject to any disclaimer, the term of this patent is extended or adjusted under 35 U.S.C. 154(b) by 240 days.

(21) Appl. No.: 13/021,153

(22) Filed: Feb. 4, 2011

(65) Prior Publication Data

US 2011/0228981 A1 Sep. 22, 2011

(30) Foreign Application Priority Data

Mar. 16, 2010 (EP) .................................... 10002758

(51) Int. Cl.
*G06K 9/00* (2006.01)
*B60Q 1/00* (2006.01)

(52) U.S. Cl. ........................ 382/106; 382/291; 340/436

(58) Field of Classification Search .................. 382/100, 382/103–107, 154, 155, 162, 168, 173, 181, 382/199, 214, 232, 254, 274, 276, 285–294, 382/305, 312; 375/240.21; 359/267; 340/436; 348/43
See application file for complete search history.

(56) References Cited

U.S. PATENT DOCUMENTS

| | | | |
|---|---|---|---|
| 6,373,897 B1 * | 4/2002 | Taniguchi | 375/240.21 |
| 6,424,273 B1 | 7/2002 | Gutta et al. | |
| 6,504,569 B1 * | 1/2003 | Jasinschi et al. | 348/43 |
| 7,038,577 B2 | 5/2006 | Pawlicki et al. | |
| 7,162,055 B2 * | 1/2007 | Gu et al. | 382/103 |
| 7,929,728 B2 * | 4/2011 | Guo et al. | 382/103 |
| 8,040,227 B2 * | 10/2011 | Friedrichs et al. | 340/436 |
| 8,169,684 B2 * | 5/2012 | Bugno et al. | 359/267 |
| 2008/0309516 A1 | 12/2008 | Friedrichs et al. | |
| 2009/0153665 A1 | 6/2009 | Linsenmaier et al. | |

FOREIGN PATENT DOCUMENTS

EP 1 988 488 A1 11/2008

OTHER PUBLICATIONS

Extended European Search Report issued Sep. 1, 2011, in Patent Application No. 11001864.5.
Hendrick P. A. Lensch, et al., "A Silhouette-Based Algorithm for Texture Registration and Stitching" Graphical Models, vol. 63, No. 4, XP 001085520, Jul. 2001, pp. 245-262.
Javier Diaz Alonso, et al., "Lane-Change Decision Aid System Based on Motion-Driven Vehicle Tracking," IEEE Transactions on Vehicular Technology, vol. 57, No. 5, Sep. 2008, pp. 2736-2746.
European Office Action issued May 22, 2012 in Patent Application No. 11 001 864.5.
Marcus Magnor, et al. "Model-based Analysis of Multi-Video Data", 6th IEEE Southwest Symposium on Image Analysis and Interpretation, 2004, Mar. 28, 2004, pp. 41-45, XP55039981, DOI: 10.1109/IAI.2004.1300941, ISBN: 978-0-78-038387-6.
Office Action issued Oct. 16, 2012, in European Patent Application No. 11 001 864.5-2218.

* cited by examiner

*Primary Examiner* — Seyed Azarian
(74) *Attorney, Agent, or Firm* — Oblon, Spivak, McClelland, Maier & Neustadt, L.L.P.

(57) ABSTRACT

A method for processing image data representing a segmentation mask, comprises generating two-dimensional shape representations of a three-dimensional object on the basis of a plurality of parameter sets; and matching motion blocks of the segmentation mask with the two-dimensional shape representations to obtain a best fit parameter set. Thereby, for example, a distance between the three-dimensional object and a camera position may be determined.

18 Claims, 8 Drawing Sheets

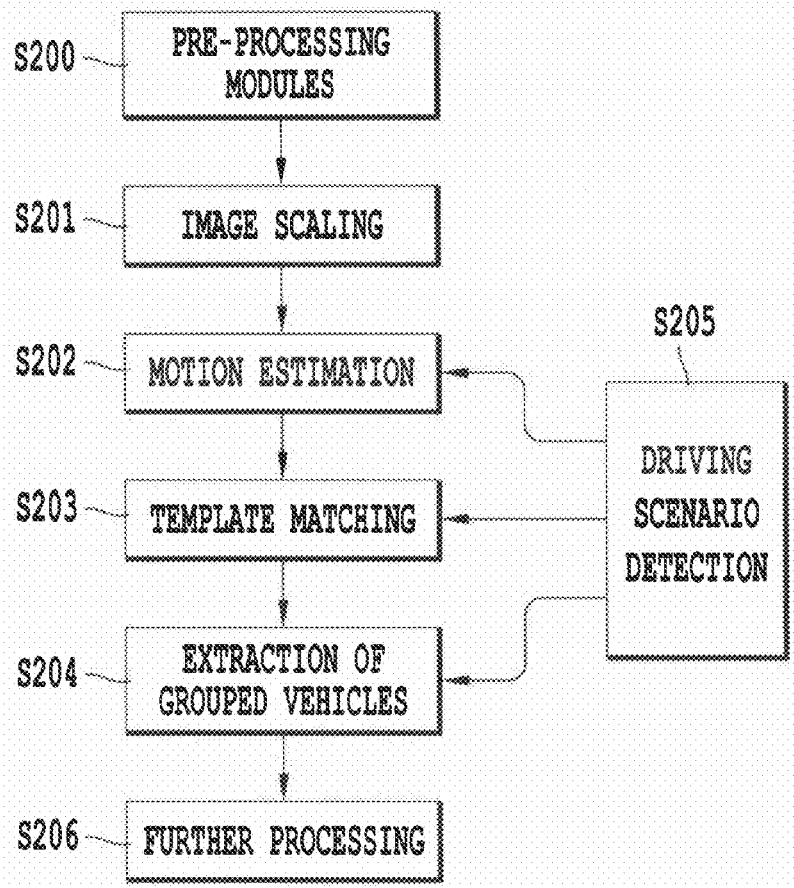
*Fig.2*
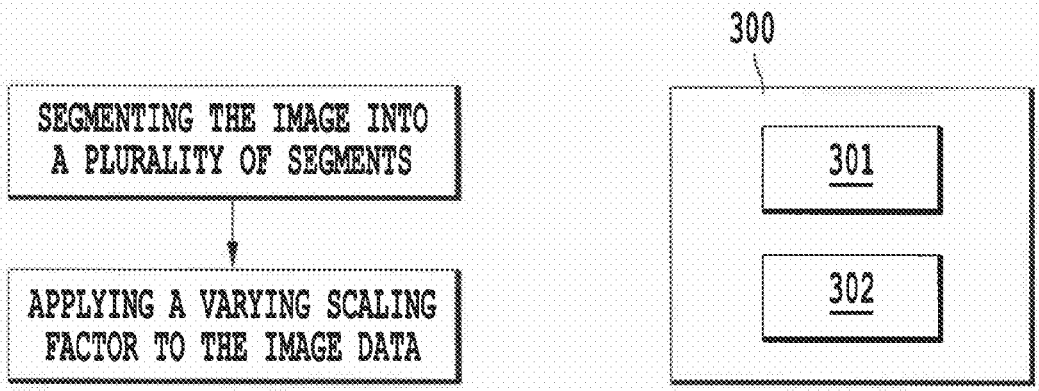
*Fig.3A*  *Fig.3B*

METHOD AND SYSTEM FOR PROCESSING IMAGE DATA

This specification relates to a method and a system for processing image data and a corresponding computer program product. For example, this method may form part of a method of detecting moving objects. Likewise, the system may form part of a system for detecting moving objects.

BACKGROUND

In the field of automotive safety applications, systems are being developed that detect vehicles in neighboring lanes for issuing a lane change warning. For example, methods have been developed in order to detect moving objects in a blind spot region of a vehicle.

For example, EP-A-1 988 505 and EP-A-1 988 488 relate to methods for detecting moving objects in a blind spot region of a vehicle. Recently, it has become desirable to also detect vehicles far behind the ego-vehicle so that the driver may be warned very early.

It is an object of the invention to provide an improved method and system to process image data and to detect moving objects, respectively.

The above object is achieved by the subject-matter claimed by the independent claims.

Further embodiments are defined in the dependent claims.

The accompanying drawings are included to provide a further understanding of embodiments of the invention and are incorporated in and constitute a part of this specification. The drawings illustrate the embodiments of the present invention and together with the description serve to explain the principles. Other embodiments of the invention and many of the intended advantages will be readily appreciated, as they become better understood by reference to the following detailed description. The elements of the drawings are not necessarily to scale relative to each other. Like reference numbers designate corresponding similar parts.

BRIEF DESCRIPTION OF THE DRAWINGS

FIG. 2 shows a schematic view of various sub-systems of an image processing system;

FIGS. 3A and 3B show a representation of a method and a system for processing image data, respectively;

In the following detailed description reference is made to the accompanying drawings, which form a part hereof and in which are illustrated by way of illustration specific embodiments in which the invention may be practiced. In this regard, directional terminology such as "top", "bottom", "front", "back", "leading", "trailing" etc. is used with reference to the orientation of the Figures being described. Since components of embodiments of the invention can be positioned in a number of different orientations, the directional terminology is used for purposes of illustration and is in no way limiting. Is to be understood that other embodiments may be utilized and structural or logical changes may be made without departing from the scope defined by the claims.

Figure 1:
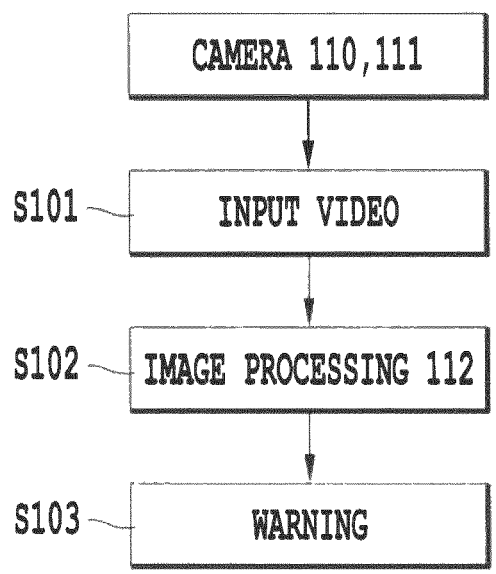
FIG. 1 shows a schematic representation of a method and a system according to an embodiment.

FIG. 1 shows a schematic representation of a method and a system according to an embodiment, that may be used for assessing the driving situation and issue a warning if a collision is likely to occur. In step S101, a sequence of video images is input as a video signal into the system. For example, a camera 110 may be used for taking the images. Images may as well be referred to as "frames" or "fields". The images may be taken for example, by a digital video camera and may be stored pixel-wise in a memory. The camera may be disposed at any appropriate position of a vehicle, for example, at the side mirror in the front portion of the vehicle or even at a rear position of the vehicle. As is clearly to be understood, a set of cameras 110, 111 may be attached to the vehicle. In particular, a first camera 110 may take images from the left-hand lane and a second camera 111 may take images from the right-hand lane with respect to the ego-vehicle. The images are fed to an image processing device that may perform a variety of processing steps, at step S102. At step S103, an evaluation of the previous image processing S102 is performed and a warning is issued if there is a threat of a collision.

The image processing system 112 may comprise a variety of sub-systems that will be explained in the following. As will be described, the image processing system 112 is suited for long distance vehicle detection approaching from behind in a lane change scenario. Accordingly, these vehicles may approach on a neighbouring lane far outside the blind spot area. For example, the system may detect multiple approaching vehicles up to approximately 80 m away, or up to an average of about 7.2 s prior to reaching the collision line in a highway scenario. Accordingly, problems occurring with respect to detection accuracy, false alarm handling and dealing with multiple objects need to be dealt with.

FIG. 2 shows a schematic view of the various sub-systems that may form part of the image processing system 112 shown in FIG. 1. After passing one or more pre-processing module(s) 200, in step S201 an image scaling may be performed by an image scaling system 201. Optionally, in step S202 a motion estimation may be performed by a motion estimation device 202. As a further option, thereafter, in step S203, moving objects may be detected in step S203 by a moving object detection device 203. Then, optionally, multiple objects in a group may be detected in step S203 by a system for detecting multiple objects in a group. During any of the steps S202, S203, S204, step S205 for detecting a driving scenario may be performed by the driving scenario detection device 205. Thereafter, optionally further processing steps S206 may be performed. As is clearly to be understood, the method or device according to an embodiment of the present invention may comprise any combination or sub-combination of the above steps S201 to S205 or of the sub-systems 201 to 205. The function of any of the shown sub-systems and steps will be explained in the following.

I. Image Scaling

As is shown in FIG. 3A, a method for processing image data of an image may comprise segmenting the image into a plurality of segments;

applying a scaling factor to the image data that are disposed in a specific segment of the image, wherein different scaling factors are assigned to different segments of the image.

As is further shown in FIG. 3B, a system 300 for processing image data of an image may comprise a first component 301 that is adapted to segment the image into a plurality of segments; and a second component 302 that is adapted to apply a scaling factor to the image data that are disposed in a specific segment of the image, wherein different scaling factors are assigned to different segments of the image.

Moreover, the embodiment provides a computer program product that is adapted to perform the above method.

Figure 4A:
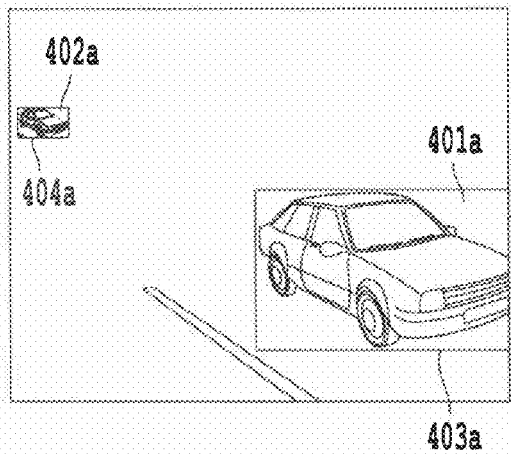
FIGS. 4A and 4B show a raw image and an image that has been processed.
Figure 4B:
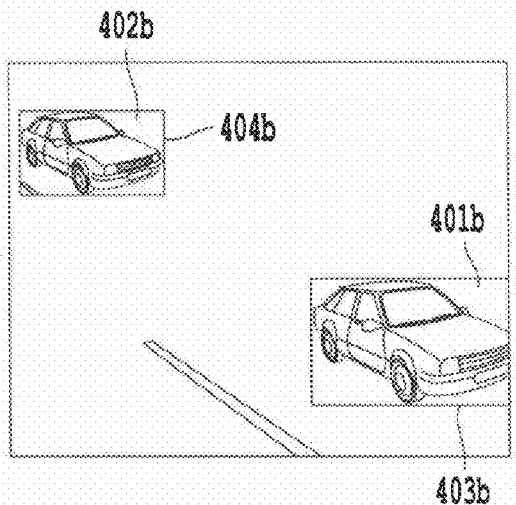

FIGS. 4A and 4B show a raw image (FIG. 4A) and an image that has been processed according to this method (FIG. 4B). As is shown, an image 401a that has a short distance to the camera is reduced in size to result in the transformed object 401b. Moreover, an object 402a that has a large distance with respect to the camera, is enlarged in size to result in the transformed object 402b. For example, the box 403a of the close object 401a is reduced in size due to this processing, resulting in the transformed box 403b, and the box 404a enclosing the distant object is enlarged due to this processing, resulting in the transformed box 404b.

Figure 5A:
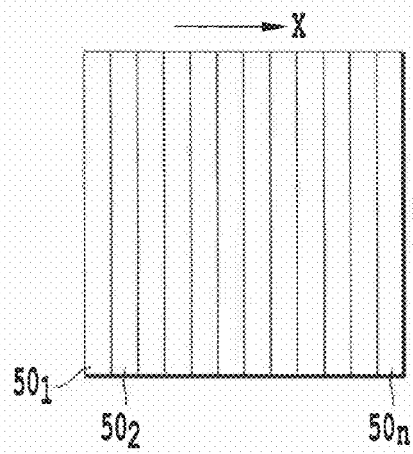
FIG. 5 shows an example of a transformation.
Figure 5B:
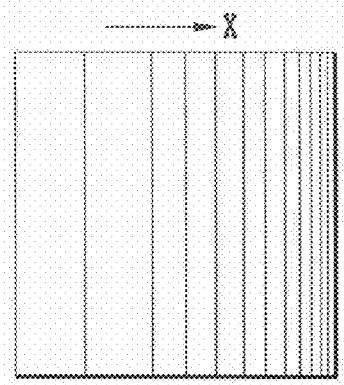

FIG. 5 shows an example how this processing may be implemented. The image may be segmented along a first direction, for example, the x-direction into a plurality of segments $50_1 \ldots 50_n$. Thereafter, a varying scaling factor is assigned to each of these segments. Then, the pixel sizes are multiplied by these specific scaling factors. According to an embodiment, the segments may be arranged along one axis. As a modification, the segments may be disposed along two different axes that are orthogonal to each other. For example, the scaling factor may decrease in a monotonic manner along a direction, for example, the x-direction or the y-direction, of the image. Moreover, the scaling factor may decrease from a value larger than one to a value smaller than one. In the shown example, the scaling factor decreases from a value above 1 to a value below 1 in a direction from left to right. For example, the scaling factor may decrease in a linear manner with respect to the distance of the moving object to the ego-vehicle.

The described method performs a bilinear interpolation with a constantly changing scaling factor along each of the axes. Accordingly, a single image representation of multiple scales is obtained. Thereby, the items that are far away are enlarged in size whereas the nearby-portions shrink. Accordingly, a representation of all the portions of the image may be obtained so that the objects and the motion thereof may be detected without the need of too much computational cost. In particular, as can be taken from FIG. 4B, due to the presence of various scales, all relevant portions of the image may be detected. As a result, when the described method is applied to vehicle detection, approaching vehicles may be detected very early or at a large distance.

As becomes apparent from the above description, the system may be implemented as a processing device that is adapted to process the image data that have been received by the camera. Alternatively, the camera may comprise a special optical system that is adapted to perform the above method. Still further, there may be a special optical system that does not form part of the camera such as a mirror or the like, the special optical system being adapted to perform the above method.

II. Motion Estimation

In conventional systems, the motion field is calculated between consequent frames. Accordingly, a motion of at least one pixel per frame should occur so as to be detected. Based on the image resolution and camera orientation, this motion may be transformed into the actual motion of the world object. For example, if a vehicle approaching from behind (at a specific track, for instance), is considered, the image motion at (x, y) with velocity of one pixel can be transformed to the real world distance S(x,y) in meters and velocity $v(x)=dS(x)/dx$ in the x-direction. V(x) is the minimal detectable velocity in meters per frame. Accordingly, increasing the capture rate of the video stream will also increase the minimal real world speed of the object in order to be detected. Generally, it is desirable that the capture rate of the video stream is adapted to the minimal real world speed of the object to be detected. However, if the objects to be detected are disposed in a large range of distances and there may be a large range of real world speeds. For example, a high capture rate is desirable for such regions of the image where the real world high-speed motion is close to the camera, such as the blind spot, where the motion estimator might have problems to find the match due to the high x motion in the image plane. In all other cases the motion detection improves with a lower frame rate. For example, slower objects may be detected earlier with a lower frame rate and thus an increased detection distance. As it was found out, this is very helpful for the detection of vehicles at long distances.

Figure 6:
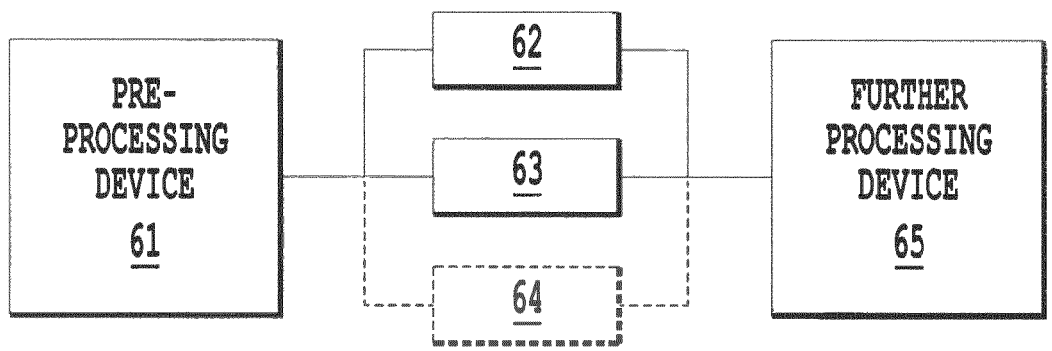
FIG. 6 illustrates a method and a system for processing image data.

As is shown in FIG. 6, a method for processing image data may comprise supplying the image data concurrently to a first motion estimator 62, the first motion estimator 62 being adapted to identify moving blocks which have performed a movement between consecutive images of a first sequence, the first sequence having a first frame rate; and a second motion estimator 63, the second motion estimator being adapted to identify moving blocks which have performed a movement between consecutive images of a second sequence, the second sequence having a second frame rate.

Likewise, a system for processing image data comprises a first motion estimator 62, the first motion estimator 62 being adapted to identify moving blocks which have performed a movement between consecutive images of a first sequence, the first sequence having a first frame rate; and a second motion estimator 63, the second motion estimator 63 being adapted to identify moving blocks which have performed a movement between consecutive images of a second sequence, the second sequence having a second frame rate.

Moreover, the embodiment provides a computer program product that is adapted to perform the above method.

In the example shown in FIG. 6, the image data are first processed by a pre-processing block 61. For example, the pre-processing block 61 may include various processing devices such as filtering devices, image correction devices and others. Thereafter, the image data are supplied to the first motion estimator 62 as well as to the second motion estimator 63. Optionally, the image data may as well be supplied to a third motion estimator 64 that identifies moving items that have performed a movement between consecutive images of the third sequence wherein the third sequence has a third frame rate. For example, the first frame rate may be a multiple integer of the second frame rate.

As an example, the frame rate of the first motion estimator 62 may be 30 fps (frames per second), corresponding to a distance of 33 ms between consecutive images. This frame rate corresponds to the frame rate of a typical camera. Moreover, the second frame rate may be 3 fps so that the first frame rate corresponds to the 10-fold of the second frame rate. Accordingly, when analyzing consecutive images at the first and the second frame rates, the second motion estimator 63 analyses every tenth frame of the sequence, whereas the first motion estimator 62 analyses every single image of the sequence. Accordingly, this arrangement covers a higher range of detectable speeds. To be more specific, the motion estimator shown in FIG. 6, detects low speeds as well as high speeds. The first motion estimator 62 still ensures the detection of high-speed approaching vehicles, which are the most interesting and keeps their response delay to a minimum. Moreover, the second motion estimator 63 detects slow pixel motion of slow vehicles and all distant vehicles. The close slow vehicles generate a slow pixel motion due to the camera perspective and their driving direction towards the camera. The estimated motion fields of each of the motion estimators are then normalized and combined to a final result.

Optionally, a third motion estimator 64 may be present so as to be adapted to a specific camera or lens setup. As is clearly to be understood, additional motion estimators may be present in the system according to the described embodiment.

III. A Template Matching Technique

The template matching technique aims at detecting moving objects from an image sequence so that the distance of the moving objects from the camera may be detected. In order to obtain reliable results, it is desirable to accurately determine the moving objects from a sequence of images.

The mono-ocular camera that is usually used for taking the images, is a 2D sensor that is not configured to deliver depth information. Accordingly, additional processing is needed in order to assess the distance information of the detected objects. The detected objects are normally represented by a segmentation mask that describes which pixels of the image belong to a potential object.

Figure 7A:
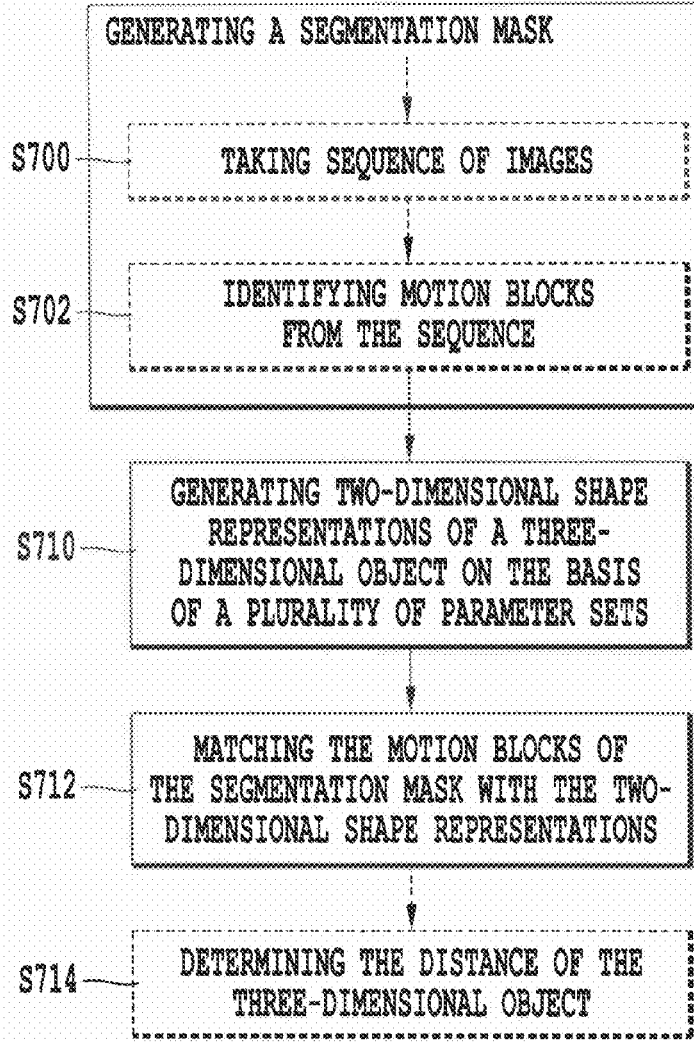
FIG. 7A illustrates a method for detecting a moving object.

As is shown in FIG. 7A, a method for detecting a moving object may comprise:

Generating two-dimensional shape representations of a three-dimensional object on the basis of a plurality of parameter sets (S710); and matching motion blocks of a segmentation mask with the two-dimensional shape representations (S712) to obtain a best fit parameter set.

For example, the two-dimensional shape representations of the three-dimensional object may be generated using a plurality of parameter sets comprising the distance of the three-dimensional object and a viewing perspective, e.g. viewing angle. From the matching of the motion blocks of the segmentation mask with these two-dimensional shape representations, the best matching shape representation and, consequently, the best fit parameter set may be obtained. By way of example, the distance of the three-dimensional object may be assessed from this best fit parameter set (S714). Nevertheless, as is readily to be understood, different parameters such as vehicle model or object size could as well be taken as parameters and be determined based on this matching method.

According to an embodiment, the segmentation mask including motion blocks may be generated by:

taking a sequence of images (S700);

partitioning each of the images of the sequence into blocks (S702); and identifying motion blocks from the sequence.

According to an embodiment, identifying motion blocks may comprise:

identifying a moving block;

determining direction and distance of movement of the moving block; and grouping adjacent moving blocks with directions and distances within predetermined intervals to form the motion blocks.

In step S700, a sequence of images is taken.

For example, when identifying moving blocks, each block may comprise 8×8 or 16×16 pixels, but not only square blocks but blocks of other shapes or with another number of pixels are also possible. Further, blocks that have moved between consecutive images of the sequence may be identified. For example, this may be accomplished using a motion estimator as has been described above under section II. A movement of a block may be detected by calculating an error criterion for possible block displacements. The sum of absolute differences, the correlation products or other methods may be used as match criteria, for example.

Then, a distance and a direction of the movement may be determined, for example, by comparing the position of the moving blocks in consecutive images. The movement in a "similar" direction by a "similar" distance may also be determined by calculating a motion vector between blocks of consecutive images and comparing the motion vector. In step S702, adjacent blocks, for which direction within a predetermined direction interval and distance with a predetermined distance interval have been determined, are grouped in motion blocks. The predetermined direction interval and the predetermined distance interval are used to detect movement in basically the same direction by basically a same distance. The predetermined intervals may be fixed or may be adaptive, e.g. to the actual directions or distances of the moving blocks. Accordingly, moving blocks which basically move in the same direction by a same distance are grouped together to form motion blocks constituting a segmentation mask.

Usually, the segmentation mask represents the detected objects, describing which pixels of the image belong to a potential object such as a vehicle to be detected. The segmentation mask may contain multiple detected objects as well as false alarms. The non-connected, contiguous blocks may be isolated and processed alone as possible vehicle candidates. For improving the accuracy of the detection, a projection of the real world objects into the pixel coordinates is accomplished. Accordingly, valid objects are transformed into a 2-dimensional representation.

In step S710, two-dimensional shape representations of the moving object are generated. For example, this may be accomplished by calculating a plurality of images of the three-dimensional object on the basis of a plurality of parameter sets. For calculating the image, for example, a perspective transformation may be employed, utilizing constant camera calibration parameters, any information about the optical imaging onto the sensor, the height of the camera as well as variable parameters such as the distance of the object and the camera perspective. Accordingly, for a plurality of sets of parameters a plurality of two-dimensional shape representations are generated. Accordingly, it is attempted to project the real world as well as the moving objects to the pixel coordinates, utilizing various specific perspectives from which the images were taken.

Thereafter, in step S712, the motion block of the segmentation mask is matched with the two-dimensional shape representations, to obtain the best fit. For example, the best fit may be assessed utilizing a matching score that is computed as a ratio of three areas.

$$\text{Score}=(A-w_1B)/(A+w_2C).$$

Figure 7B:
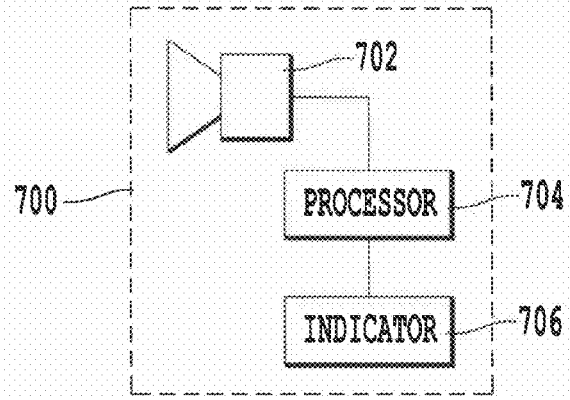
FIG. 7B illustrates a system for detecting a moving object.

In the above formula, area A is covered by both the motion block under consideration and the shape representation. Area B is inside the shape representation but not covered by the motion block. Area C is inside the motion block but outside of the shape representation. $w_1$ and $w_2$ are the weights. In case of a perfect match, B and C would be zero resulting in a score of 1.0. In all other cases, the final score is below 1.0 and depending on the weight it can be prioritized to select either maximal inner overlapping of the motion block and the shape representation or the minimal outer non-overlapping areas. This method takes into account that the determination of the motion block may be inaccurate and spread out to some neighboring image regions that are not a vehicle. After finding the best-matching two-dimensional shape representation, the best-fit parameter set, for example including distance and viewing perspective, is obtained. FIG. 7B shows an embodiment of a system for detecting moving objects. The system may comprise a camera 702, a processor or processing device 704 and an indicator 706. The camera 702 is configured to take a sequence of images as has been explained above. For example, the camera 702 may be a monocular camera. The processor 704 may be configured to partition each of the images of said sequence into blocks, to identify moving blocks that have performed a movement between consecutive images of the sequence, to determine a direction and a distance of the movement of the moving blocks, and to group adjacent moving blocks, for which directions within a predetermined direction interval and distances within a predetermined distance interval has been determined, to form motion blocks. Moreover, the processor may be configured to generate two-dimensional shape representations of a three-dimensional object in a manner as has been explained above with reference to step S710. The processor 704 is further adapted to match the motion block with the two-dimensional shape representations to obtain a best fit parameter set as has been explained above. The present embodiment also relates to a computer program product that is adapted to perform any of the functions as has been explained above. For example, the computer program product may be adapted to perform the steps S702 to S714 as has been explained above. Moreover, there may be several computer program products that are adapted to generate a segmentation mask, for example, in a manner as has been explained above and the steps S710 to S714. Nevertheless, it is clearly to be understood, any combinations of steps may be implemented in different computer program products.

FIG. 8 shows an example of an image having different areas to which the above method is applied.

Figure 8A:
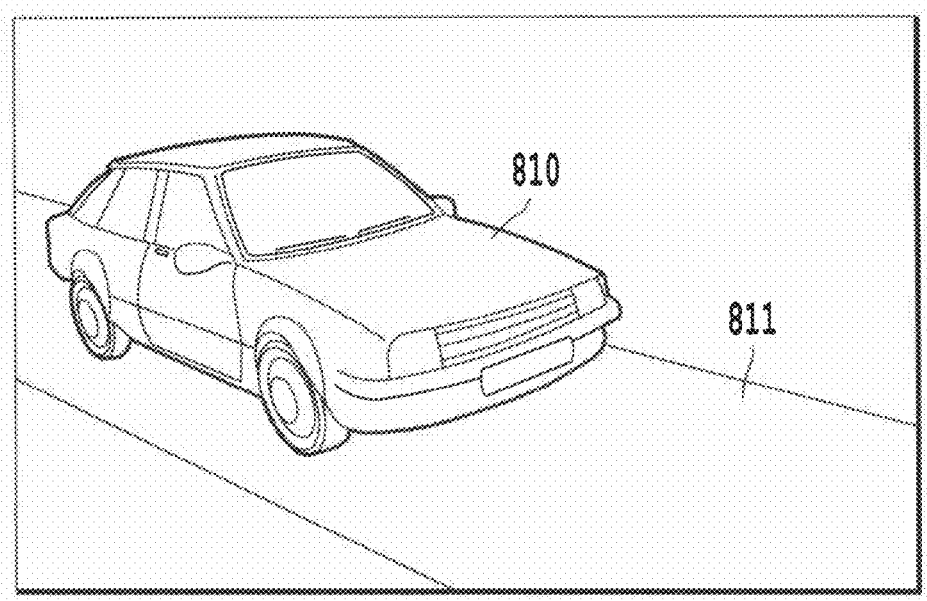
FIG. 8A shows an example of an object that may be detected.
Figure 8B:
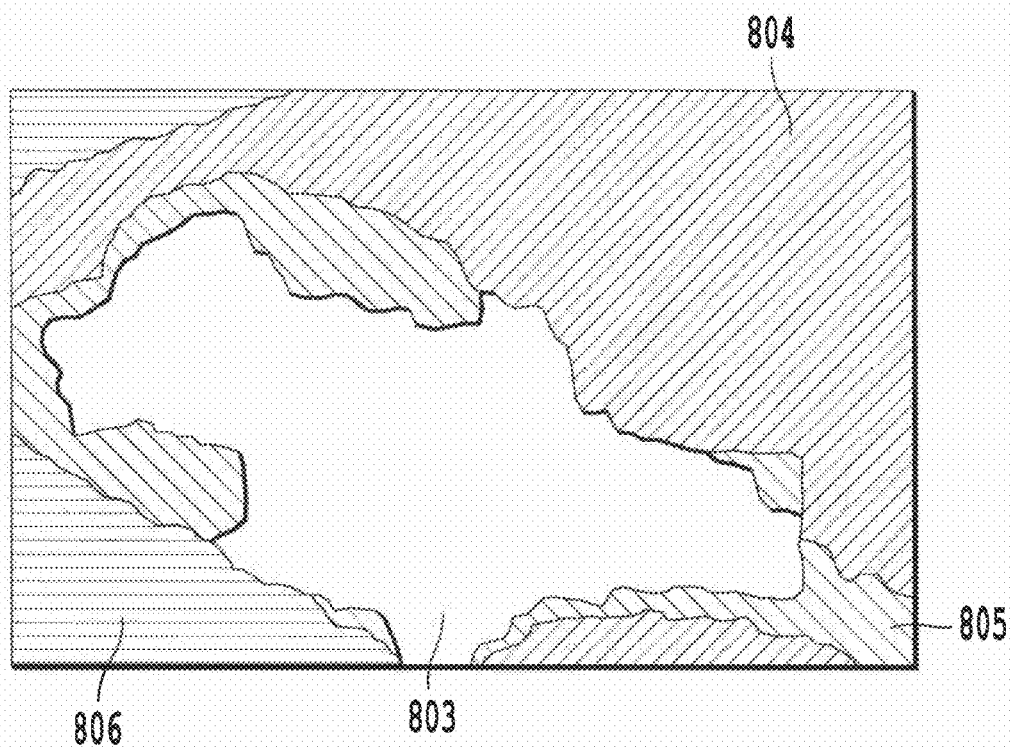
FIG. 8B shows an example of a segmentation mask.

FIG. 8A shows an example of a vehicle 810 driving on a road 811. FIG. 8B shows a segmentation mask that may be obtained from a sequence of images that are taken of the vehicle 810. The different portions 803, 804, and 805 shown in FIG. 8B illustrate the various blocks that may be obtained from an evaluation of the sequence of images. For example, there may be a motion block 804 corresponding to the surroundings of the road 811, a motion block 805 corresponding to the road, and a motion block 803, corresponding to a potential vehicle to be detected. 806 refers to a non-moving portion on the left-hand portion of the road.

Figure 8C:
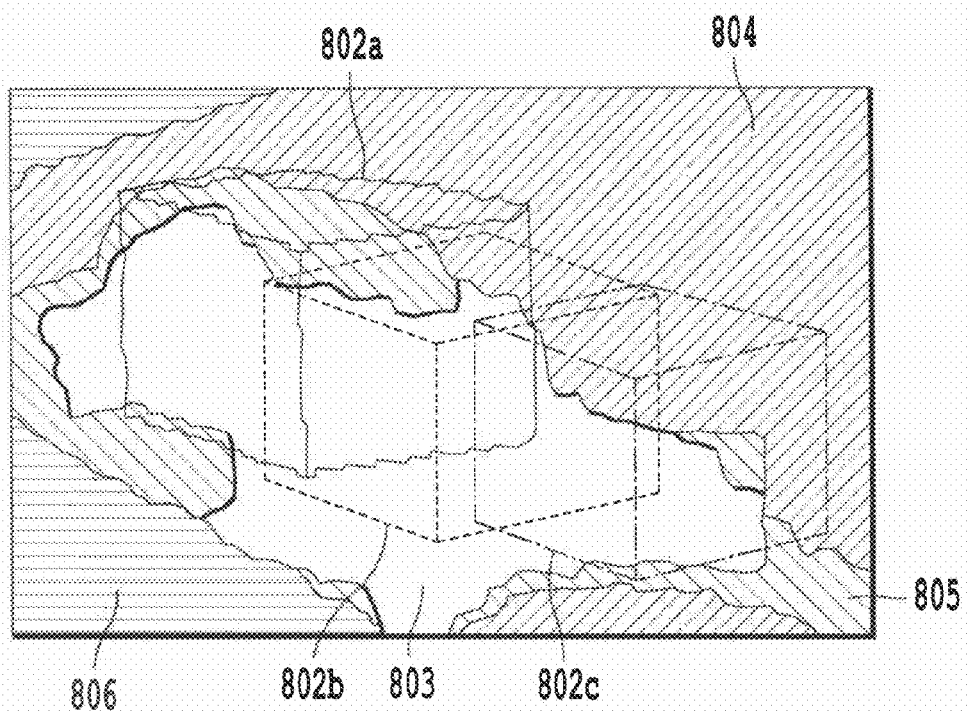
FIG. 8C shows an example of a segmentation mask with a plurality of two-dimensional shape representations overlaid.
Figure 8D:
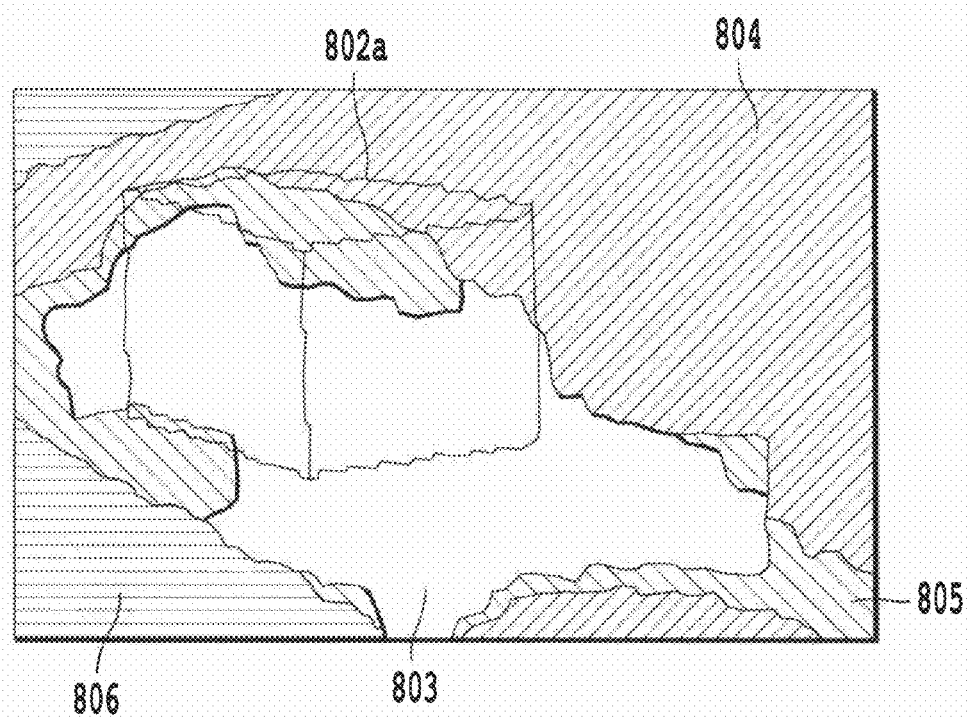
FIG. 8D shows an example of a segmentation mask with an example of a matched two-dimensional shape representation.

According to the embodiment illustrated in FIG. 8C, a plurality of two-dimensional shape representations 802a, 802b, 802c of a vehicle are generated. As has been described above, when generating this shape representation 802, the specific parameters that have been used when capturing the images for forming the segmentation mask have to be taken into account. Moreover, different parameter sets including, for example, distance and viewing perspective are taken into account. Accordingly, various shape representations 802a, 802b, 802c having a shape of a box are generated. According to the method as described above, the motion block 803 is matched with each of the shape representations 802a, 802b, 802c. As a result of this matching procedure, the best matching shape representation 802a is obtained. Accordingly, as is shown in FIG. 8D, the actual position of the vehicle is as illustrated by shape representation 802a. From the specific parameter set that has been used for generating the shape representation 802a, distance and viewing perspective for this specific object may be assessed. Hence, the remaining portions of area 803 are assumed to not to belong to the object to be detected. Accordingly, as becomes apparent from FIG. 8D, there are many invalid portions of the image belonging to the block 803 that represents the potential vehicle to be detected. Assessing the position of the moving vehicle from such an invalid portion would result in false results.

IV. Detection of Grouped Vehicles

With increasing detection range, new challenges arise to deal with traffic on the neighboring lane. In particular, single objects have to be detected from a group of multiple objects. Moreover, in a typical side-view perspective the pose and appearance of vehicles changes across the detectable range. For example, approaching vehicles may occlude following vehicles or appear as a long vehicle when driving close to each other. To be more specific, when generating a segmentation mask, motion blocks may be determined that comprise multiple vehicles at a short distance.

Figure 9:
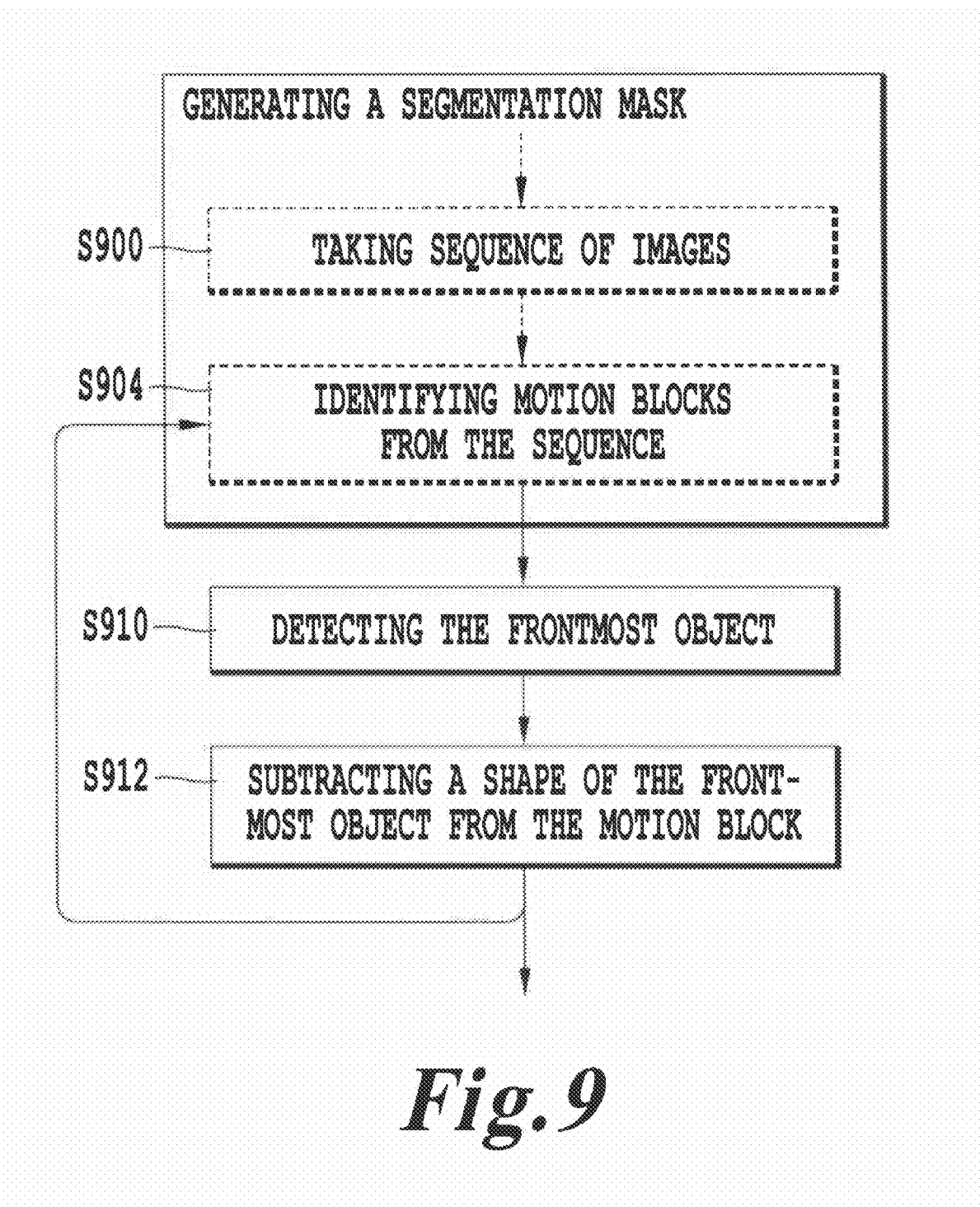
FIG. 9 shows a method of detecting multiple objects.

FIG. 9 schematically illustrates a method of detecting multiple objects in a group.

For example, the method may comprise:
  Generating a segmentation mask comprising motion blocks;
  detecting a front most object from the motion block; and
  subtracting a shape of the front most object from the motion block.

Moreover, a system for processing image data may comprise components that are adapted to perform the method as described above. For example, the system may have a construction as is shown in FIG. 7B.

With reference to FIG. 9, for example, for generating a segmentation mask, in step S900, a sequence of images may be taken, in a similar manner, as has been described above with reference to FIG. 7. In step S904, motion blocks may be identified from the sequence. For example, this may be accomplished by performing the steps as described above with reference to FIG. 7. To this end, according to an embodiment, each of the images of a sequence may be partitioned into blocks in a similar manner as described above. Moreover, blocks that have been moved between consecutive images of the sequence may be identified in a similar manner as has been described with reference to FIG. 7. Then, a distance and a direction of the movement may be determined in a similar manner as in FIG. 7. Adjacent blocks for which directions within a predetermined direction interval and distances within a predetermined distance interval have been determined may be grouped to form motion blocks in a similar manner as has been described with reference to FIG. 7. Then in step S910, the front most object may be detected from the motion block. For example, this may be accomplished by any suitable method. As an example, the front most object may be detected by performing the matching method as has been described above under section III. Thereafter, in step S912, the front most object is subtracted from the image. For example, the pixels relating to the front most objects may be removed from the image, e.g. the corresponding motion block. This creates one or multiple residual motion blocks which are again validated to be a potential object or not (step S904). According to an embodiment, the steps S904 to S912 may be repeated until no further blocks are present in the image. Accordingly, a group of vehicles is detected as a closed segmented region from the segmentation mask based on the motion vectors. If the motion blocks are not well segmented, the residual ones may create false alarms or inaccurate detection. Accordingly, it is desirable to have a reliable segmentation and distance estimation method. Hence, the methods as have been described above are suitable for processing the image data prior to performing the present method.

V. Driving Scenario Detection

According to this embodiment the parameters of any of the methods as have been explained above may be adjusted according to the specific driving scenario of the vehicle. For example, based on the information available on the vehicles CAN-bus such as speed, steering angle, current gear, the system may distinguish between different driving scenarios such as:
- parking/off
- urban/traffic jam
- country side
- highway According to the embodiment, the mode selection may be based on the gathered statistics (average, variance, maxima) of the CAN data over a specific time interval in combination with the velocity ranges for each category.

| Mode | Velocity | Steering Angle | Gear |
|---|---|---|---|
| Parking/Off | <10 km/h | $\sigma^2$ high, max high | N, R |
| Urban/Traffic Jam | 0-70 km/h, $\sigma^2$ high | $\sigma^2$ high, max low-mid | N, 1-5 |
| Country-side | 50-100 km/h | $\sigma^2$ low, max low | >4 |
| Highway | >60 km/h | $\sigma^2$ very low, max very low | >4 |

In each mode the parameters used for detection and candidate tracking may be modified to correspond to the actual traffic behavior, for example, the linearity of vehicles motion, valid detection range, criteria of four candidate creation, validation and removal, false alarm probability, etc.

| Mode | Lanes/ candidate probability | False alarm threshold | Distance new candidates | Time before Removal |
|---|---|---|---|---|
| Parking/Off | — | — | — | — |
| Urban/Traffic Jam | >=1, high | High | middle | middle |
| Country-side | 1, low | Low | far | short |
| Highway | >1, high | high | far | long |

Thereby, the probability of false alarms may be drastically decreased.

Figure 10:
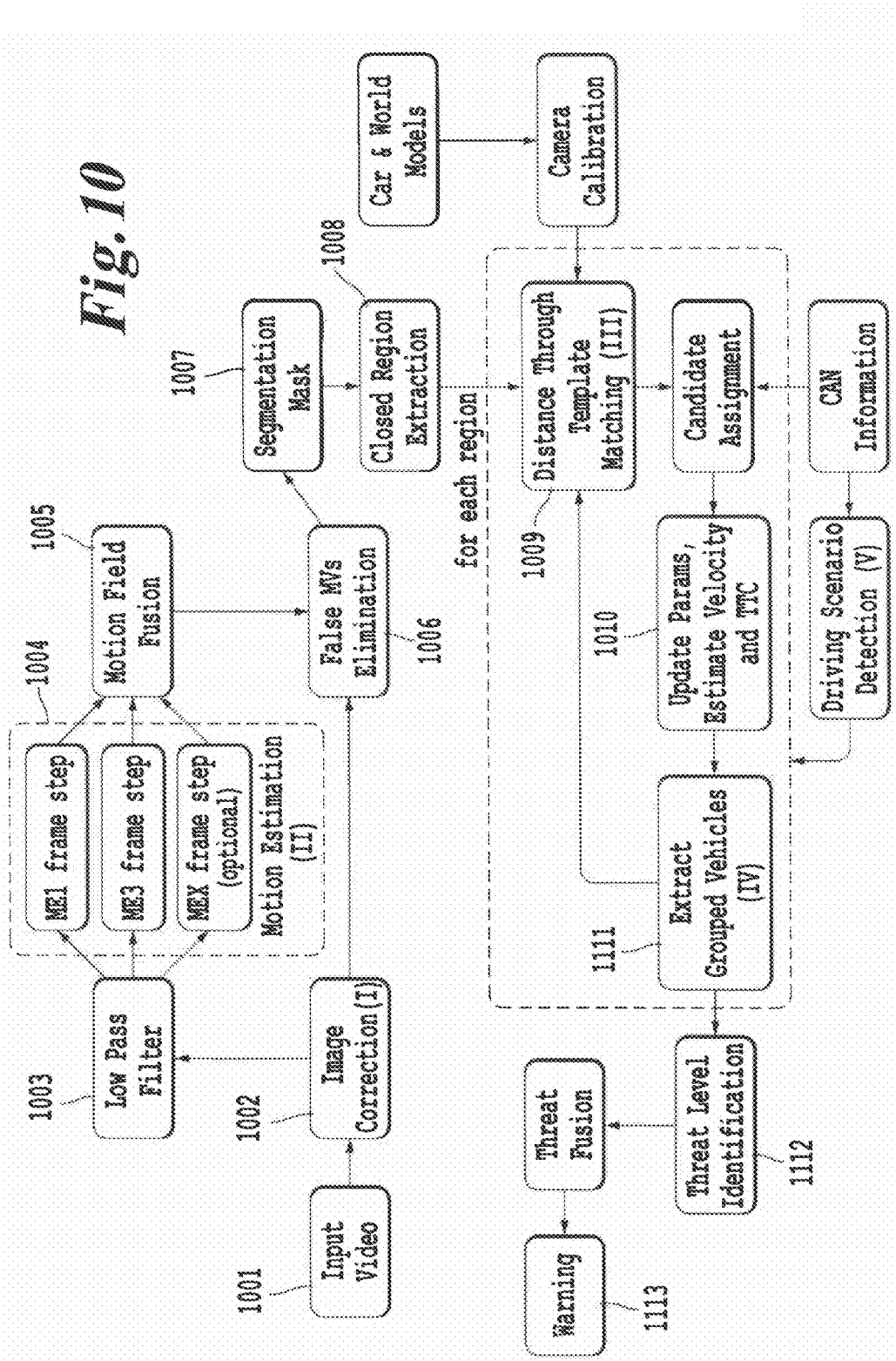
FIG. 10 shows an example of a system for issuing a warning.

FIG. 10 shows an overview of the described method and system. At 1001 a sequence of images, for example a video sequence is input into the system. At 1002 an image correction as has been described above under I is performed. For example, the system 1002 for processing image data of an image may comprise a first component that is adapted to segment the image into a plurality of segments; and a second component that is adapted to apply a scaling factor to the image data that are disposed in a specific segment of the image, wherein different scaling factors are assigned to different segments of the image. Likewise, the method that is performed in the system 1002 may comprise segmenting the image into a plurality of segments, and applying a scaling factor to the image data that are disposed in a specific segment of the image, wherein different scaling factors are assigned to different segments of the image. Accordingly, from the image data that have been processed by the system 1002, moving objects at a large distance may be enlarged and, consequently, be detected very early.

Thereafter, according to a first option, the data may be passed to a low pass filter 1003. Then the data are transferred to a system 1004 for performing motion estimation. For example, the system 1004 may comprise a first motion estimator, the first motion estimator being adapted to identify moving blocks which have performed a movement between consecutive images of a first sequence, the first sequence having a first frame rate; and a second motion estimator, the second motion estimator being adapted to identify moving blocks which have performed a movement between consecutive images of a second sequence, the second sequence having a second frame rate. Likewise, the method performed by the system 1004 may comprise supplying the image data concurrently to a first motion estimator, the first motion estimator being adapted to identify moving blocks which have performed a movement between consecutive images of a first sequence, the first sequence having a first frame rate, and to a second motion estimator, the second motion estimator being adapted to identify moving blocks which have performed a movement between consecutive images of a second sequence, the second sequence having a second frame rate.

The information acquired during the motion estimation 1004 is fused at 1005 and then at 1006 the false moving vehicles may be eliminated from the data. Optionally this step may be performed immediately after the image correction at 1002. At 1007 a segmentation mask is generated from the obtained data and closed regions are extracted at 1008. Then, for each region a template matching as has been described under III may be performed at 1009. For this template matching the real existing cars and world may be modeled and transferred by a shape representation as has been explained above. For example, such a method for detecting a moving object may comprise generating two-dimensional shape representations of a three-dimensional object on the basis of a plurality of parameter sets; and matching motion blocks of the segmentation mask with the two-dimensional shape representations to obtain a best fit parameter set. A system 1009 for performing the template matching may be adapted to match motion blocks with the two-dimensional shape representations to obtain a best fit parameter set. The two-dimensional shape representations have been previously generated on the basis of car and world models as well as the camera calibration.

The matching as has been explained above may comprise a candidate assignment and an estimation of the velocity at 1010. Optionally, during all steps, the CAN information about the specific traffic situation may be utilized in order to further improve the accuracy of detection. Further, the grouped vehicles may be extracted as has been explained above under IV so as to determine each single vehicle of a group of moving vehicles. Accordingly, a method that is performed by the system 1111 may comprise generating a segmentation mask comprising motion blocks; detecting a front most object from the motion block; and subtracting a shape of the front most object from the motion block.

During any stage, the threat is estimated (for example, at 1112) and, depending on the danger of a collision a warning is given under 1113. Due to the combination of the components as shown in FIG. 10, also vehicles at long distances may be early recognized and the traffic may be reliably monitored.

While embodiments of the invention have been described above, it is obvious that further embodiments may be implemented. Accordingly, this spirit and scope of the appended claims should not be limited to the description of the embodiments contained herein.

The invention claimed is:

1. A method for processing image data representing a segmentation mask, wherein the image data are generated from a sequence of images, comprising:
generating two-dimensional shape representations of a three-dimensional object on the basis of a plurality of parameter sets;
matching motion blocks of the segmentation mask with the two-dimensional shape representations to obtain a best fit parameter set;
segmenting one of the images into a plurality of segments; and
applying a scaling factor to the image data that are disposed in a specific segment of the image, wherein different scaling factors are assigned to different segments of the image.

2. The method of claim 1, further comprising:
determining a distance between the three-dimensional object and a camera position from the best fit parameter set.

3. The method of claim 1, wherein the parameter set comprises distance and perspective of a camera, that has generated the image data, with respect to the three-dimensional object.

4. The method of claim 1, wherein the segmentation mask is generated from a sequence of images by a method comprising:
partitioning each image of the sequence of images into blocks;
identifying a moving block;
determining direction and distance of movement of the moving block;
grouping adjacent moving blocks with directions and distances within predetermined intervals to form motion blocks.

5. The method of claim 4, wherein moving blocks are identified by supplying image data of the sequence of images concurrently to
a first motion estimator, the first motion estimator being adapted to identify moving items which have performed a movement between consecutive images of a first sequence, the first sequence having a first frame rate; and
a second motion estimator, the second motion estimator being adapted to identify moving items which have performed a movement between consecutive images of a second sequence, the second sequence having a second frame rate.

6. The method of claim 1, wherein the segments are disposed along one axis.

7. The method of claim 1, wherein the segments are disposed along two axes, the two axes being orthogonal to each other.

8. The method of claim 1, wherein the scaling factor decreases from a value larger than 1 to a value smaller than 1 along an axis.

9. The method of claim 1, wherein the image data are generated from a sequence of images, the method further comprising supplying image data of the sequence of images concurrently to a first motion estimator, the first motion estimator being adapted to identify moving blocks which have performed a movement between consecutive images of a first sequence, the first sequence having a first frame rate; and
a second motion estimator, the second motion estimator being adapted to identify moving blocks which have performed a movement between consecutive images of a second sequence, the second sequence having a second frame rate.

10. The method of claim 9, wherein the first frame rate is a multiple integer of the second frame rate.

11. The method of claim 1, further comprising:
detecting a front most object from the motion block; and
subtracting the front most object from the motion block.

12. A method for detecting a moving object, comprising generating image data by taking a sequence of images; and performing the method of claim 1.

13. A non-transitory computer readable medium having stored thereon a computer program that when executed by a computer causes the computer to implement the method according to claim 1 and the steps thereof when it is carried out on a data processing device.

14. A system for processing image data representing a segmentation mask, wherein the image data are generated from a sequence of images, the system comprising components that are configured
to generate two-dimensional shape representations of a three-dimensional object on the basis of a plurality of parameter sets;
to match motion blocks of the segmentation mask with the two-dimensional shape representations to obtain a best fit parameter set;
to segment one of the images into a plurality of segments; and
to apply a scaling factor to the image data that are disposed in a specific segment of the image, wherein different scaling factors are assigned to different segments of the image.

15. The system of claim 14, the system further comprising a component that is adapted to determine a distance between the three-dimensional object and a camera position.

16. The system of claim 14, wherein the image data are generated from a sequence of images, the system further comprising
a first motion estimator, the first motion estimator being adapted to identify moving blocks which have performed a movement between consecutive images of a first sequence, the first sequence having a first frame rate; and
a second motion estimator, the second motion estimator being adapted to identify moving blocks which have performed a movement between consecutive images of a second sequence, the second sequence having a second frame rate,
the first and the second motion estimators being disposed in such a manner that the image data may be concurrently fed to the first and second motion estimators.

17. The system of claim 14, further comprising components that are adapted
to detect a front most object from the motion block; and
to subtract the front most object from the motion block.

18. A system for detecting a moving object, comprising a device that is adapted to generate image data by taking a sequence of images; and
the system of claim 14.

* * * * *